United States Patent [19]

Kaufman et al.

[11] Patent Number: 4,526,843
[45] Date of Patent: Jul. 2, 1985

[54] FILM BONDED FUEL CELL INTERFACE CONFIGURATION

[75] Inventors: Arthur Kaufman, West Orange; Peter L. Terry, Chatham, both of N.J.

[73] Assignee: Engelhard Corporation, Iselin, N.J.

[21] Appl. No.: 597,559

[22] Filed: Apr. 6, 1984

Related U.S. Application Data

[63] Continuation of Ser. No. 430,148, Sep. 30, 1982, abandoned.

[51] Int. Cl.$^3$ .............................................. H01M 8/04
[52] U.S. Cl. ........................................ 429/26; 429/36; 429/38
[58] Field of Search .................. 429/35, 36, 38, 26

[56] References Cited

U.S. PATENT DOCUMENTS

| 4,233,369 | 11/1980 | Breault et al. | 429/36 X |
| 4,245,009 | 1/1981 | Guthrie | 429/16 |
| 4,374,185 | 2/1983 | Powers et al. | 429/36 |

FOREIGN PATENT DOCUMENTS 1204832  9/1970  United Kingdom .

Primary Examiner—Charles F. LeFevour

[57] ABSTRACT

An improved interface configuration for use between adjacent elements of a fuel cell stack. The interface is impervious to gas and liquid and provides resistance to corrosion by the electrolyte of the fuel cell. A multi-layer arrangement for the interface provides bridging electrical contact with a hot-pressed resin filling the void space.

11 Claims, 4 Drawing Figures

FILM BONDED FUEL CELL INTERFACE CONFIGURATION

This application is a continuation of a previous application Ser. No. 430,148 filed on Sept. 30, 1982, which has now been abandoned.

BACKGROUND OF THE INVENTION

The present invention relates to improved elements for use in fuel cell stacks, and more particularly, to a stack having a corrosion resistant, electrically conductive, fluid impervious interface member therein.

It has been known for some time that fuel cells and stacks of such cells can be extremely advantageous as power supplies, particularly for certain applications such as a primary source of power in remote areas. It is highly desirable that any such fuel cell assembly be extremely reliable. Various fuel cell systems have been devised in the past to accomplish these purposes. Illustrative of such prior art fuel cells are those shown and described in U.S. Pat. Nos. 3,709,736, 3,453,149 and 4,175,165. A detailed analysis of fuel cell technology comparing a number of different types of fuel cells appears in the "Energy Technology Handbook" by Douglas M. Consadine, published in 1977 by McGraw Hill Book Company at pages 4-59 to 4-73.

U.S. Pat. No. 3,709,736, assigned to the assignee of the present invention, describes a fuel cell system which includes a stacked configuration comprising alternating fuel cell laminates and electrically and thermally conductive impervious cell plates. The laminates include fuel and oxygen electrodes on either side of an electrolyte comprising an immobilized acid. U.S. Pat. No. 3,453,149, assigned to the assignee of this invention, is illustrative of such as immobilized acid electrolyte. In U.S. Pat. No. 4,175,165, assigned to the assignee of the present invention, a stacked array of fuel cells is described wherein gas distribution plates include a plurality of gas flow channels or grooves with the grooves for the hydrogen gas distribution being arranged orthogonally relative to the grooves for the oxygen distribution. The gas distribution plates themselves, whether they are individual termination plates for one or the other of the gases, or bipolar plates for distributing both gases in accordance with this disclosure, are formed of an electrically conductive impervious material.

In larger stacks of fuel cells, heat dissipation from the cell's operation becomes a consideration. To solve this problem, cooling cells have been employed in the stack to maintain the thermal balance of stack. These cooling cells have frequently been made of a metal such as aluminum. Metal plates have also been utilized for the current collection element in fuel cell stacks. One problem which arises with respect to both the cooling plates and the current collecting plates in a fuel cell stack is that they are subject to corrosion attack by the acid electrolyte. In order to prevent corrosion, an interface layer has been utilized comprising a conductive carbon layer, such as Grafoil manufactured by Union Carbide Corporation, and a copper screen arranged between the cooling or current collecting plate and the next termination plate. The interface layer can be a highly rolled, densely-packed, carbon, fibrous material which is at least partially resistant to acid attack. Given the foregoing considerations in fuel cell stack designs, there is a continuing need to solve these problems while keeping the manufacturing and maintenance costs of the stacks as low as possible.

Accordingly, it is the aim of this invention to provide an improved interface configuration between elements of a fuel cell stack.

It is a further aim of this invention to provide such an interface configuration which is impervious to gas or liquids so as to impart resistance to corrosion by the electrolyte and to provide good electrical and thermal conductivity.

It is a further aim of this invention to provide a fuel cell stack including at least one of said improved interface configurations.

It is also an aim of this invention to provide a process for making the improved interface configuration and fuel cell stack as above.

SUMMARY OF THE INVENTION

In accordance with this invention, an improved interface configuration is provided for use between elements of a fuel cell stack. The interface configuration is gas and liquid impervious to resist migration of the acid electrolyte used in the cell which could cause corrosion. Corrosion products can communicate back to and impair the operation of or poison the catalyst at the fuel cell electrodes. It is also essential that the various elements in the fuel cell stack be electrically interconnected to provide bridging electrical contact between adjacent elements. The interface configuration, in accordance with this invention, is useful between a gas distribution plate and an adjacent current collecting plate or between a gas distribution plate and an adjacent cooling plate.

A fuel cell stack is provided having a plurality of stacked elements wherein at least one corrosion resistant electrically conductive interface is arranged between two of said elements which are adjacent to one another. The interface comprises a first conductive layer and a second perforate conductive layer bonded by a hot-pressed resin. The first and second conductive layers and the resin are arranged to provide bridging electrical contact between a gas distribution plate and a current collecting plate or cooling plate, the resin filling substantially any remaining void space in the first and second conductive layers.

In accordance with one embodiment of the invention, the process for forming the interface configuration between adjacent elements of the fuel cell stack comprises arranging a current collecting plate or a cooling plate, a first perforate conductive layer; a second conductive layer; and a resin layer between the first and second conductive layers. This composite is hot pressed together, thereby causing the resin to flow into the voids in the first and second conductive layers without adversely affecting electrical conductivity between these layers.

BRIEF DESCRIPTION OF THE DRAWINGS

The invention will now be described by reference to the following drawings and description in which like elements have been given common reference numbers.

DETAILED DESCRIPTION OF THE PREFERRED EMBODIMENT

Figure 1:
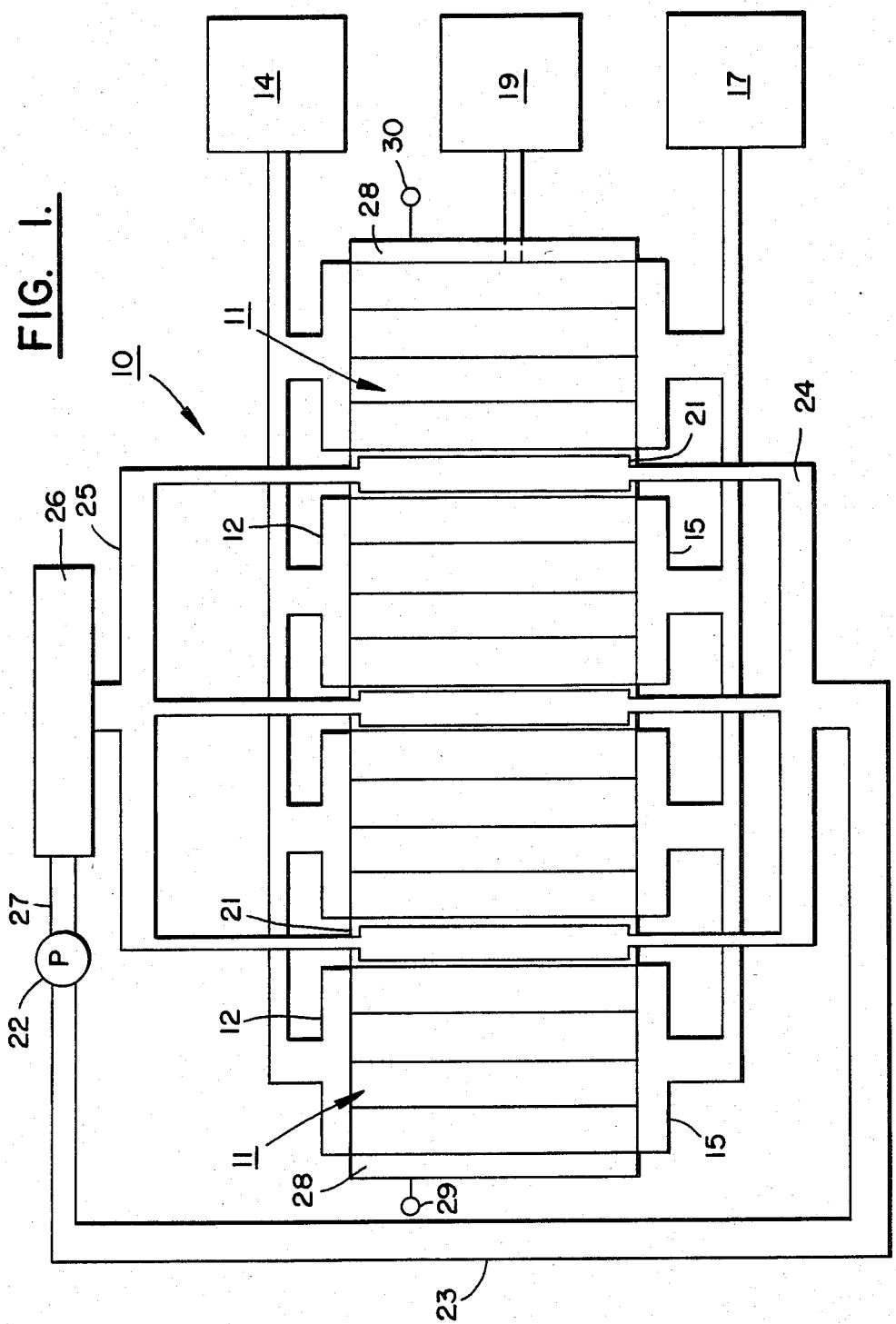
FIG. 1 is a schematic representation of a fuel cell assembly comprising a plurality of stacked fuel cells with intermediate cooling plates and terminal current collecting plates.

An exemplary fuel cell stack assembly 10 employing a plurality of fuel cells 11 in accordance with this invention is now described with reference to FIGS. 1 and 2. Hydrogen gas input manifolds 12 are arranged along one side of the stack assembly 10. While a plurality of manifolds 12 are shown for each group of fuel cells 11, if desired, a single manifold arrangement could be used. The manifolds 12 are connected to a source of hydrogen gas 14. Hydrogen gas collecting manifolds 15 are arranged along the opposing stack side in correspondence with the gas input manifolds 12. Here again, while a plurality of manifolds 15 are shown, a single manifold could be used if desired. The collecting manifolds 15 are, in turn, connected to a hydrogen gas discharging system 17. The hydrogen gas from the input manifolds 12 flows through gas distribution plates 18 to the collecting manifolds 15.

In a similar fashion, a plurality of oxygen or air input manifolds (not shown) are arranged along the stack side (not shown) connecting the one stack side and the opposing stack side. These oxygen manifolds are connected to an oxygen source 19. The oxygen may be supplied in the form of air rather than pure oxygen if desired. In a similar fashion, a plurality of collecting manifolds are arranged along the stack side (not shown) opposing the stack side having the oxygen input manifolds and connecting the respective one stack side and opposing stack side. These manifolds would also be connected to an oxygen storage or recirculating system (not shown). The oxygen or air from the input manifolds(not shown) flows through the oxygen gas distribution plates 20 to the respective collecting manifolds (not shown).

In this embodiment, cooling plates 21 are arranged periodically between adjacent fuel cells 11. Three cooling plates 21 are shown arranged intermediate each four cell 11 array. The cooling fluid flowing through the cooling plates 21 is preferably a dielectric fluid, such as a high temperature oil, such an oil being manufactured by Monsanto under the trade name, Therminol. A pump 22 circulates the dielectric fluid via conduit 23 and input manifold 24 into the respective cooling plates 21. The dielectric fluid then flows into collecting manifold 25 which is connected to a heat exchanger 26 for reducing the temperature of the dielectric fluid to the desired input temperature. A conduit 27 then connects the heat exchanger back to the pump 22 so that the fluid can be recirculated through the respective cooling plates 21.

The fuel cells 11 and the cooling plates 21 are electrically conductive so that when they are stacked as shown, the fuel cells 11 are connected in series. In order to connect the stack assembly 10 to a desired electrical load, current collecting plates 28 are employed at the respective ends of the stack assembly 10. Positive terminal 29 and negative terminal 30 are connected to the current connecting plates 28 as shown and may be connected to the desired electrical load by any conventional means.

Each fuel cell 11 is made up of a plurality of elements and includes a hydrogen gas distribution plate 18 and an oxygen or air distribution plate 20. Arranged intermediate the respective gas distribution plates 18 and 20 are the following elements starting from the hydrogen gas distribution plate 18; anode 31, anode catalyst 32, electrolyte 33, cathode catalyst 34 and cathode 35. These elements 31–35 of the fuel cell 11 may be formed of any suitable material in accordance with conventional practice.

The hydrogen gas distribution plate 18 is arranged in contact with the anode 31. Typically, the anode comprises a carbon material having pores which allow the hydrogen fuel gas to pass through the anode to the anode catalyst 32. The anode 31 is preferably treated with Teflon (polytetrafluoroethylene) to prevent the electrolyte 33, which is preferably an immobilized acid, from flooding back into the area of the anode. If flooding were allowed to occur, the electrolyte would plug up the pores in the anode 31 and lessen the flow of hydrogen fuel through the cell 11. The anode catalyst 32 is preferably a platinum containing catalyst. The cell 11 is formed of an electrically conductive material, such as a carbon based material, except for the immobilized acid electrolyte layer which does not conduct electrons but does conduct hydrogen ions. The various elements, 18, 31–35, and 20 are compressed together under a positive pressure. The electrolyte 33, such as phosphoric acid, is immobilized by being dispersed in a gel or paste matrix so that the acid is not a free liquid. An exemplary electrolyte matrix could comprise a mixture of phosphoric acid, silicon carbide particles and Teflon particles.

The cathode catalyst 34 and the cathode 35 are formed of the same types of materials as the respective anode catalyst 32 and anode 31. Therefore, the anode 31 and the cathode 35 comprise porous carbon and the anode catalyst 32 and cathode catalyst 34 can comprise a platinum containing catalyst. The cathode 35 can also be treated with Teflon to prevent the electrolyte from flooding back into the porous carbon comprising the cathode.

Figure 2:
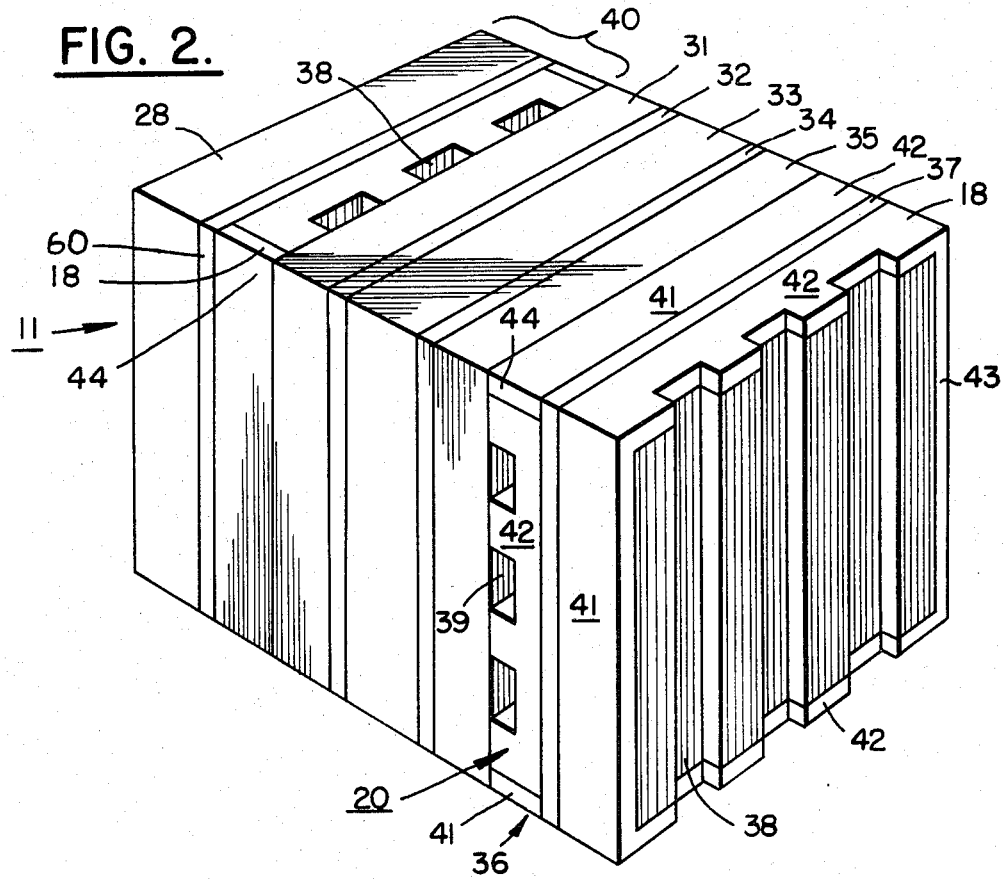
FIG. 2 is a perspective view of a portion of the fuel cell assembly of FIG. 1, illustrating an individual fuel cell in greater detail.

All of the elements of the cell 11 are arranged in intimate contact as shown in FIG. 2. In order to provide an electrically interconnected stack assembly 10, bi-polar assembly 36 is used to connect together adjacent fuel cells 11. A bi-polar assembly 36 is comprised of a hydrogen gas distribution plate 18 and an oxygen or air distribution plate 20 with an impervious interface layer or plate 37 arranged between them. Therefore, a bi-polar assembly 36 is comprised of the hydrogen gas distribution plate 18 of one cell 11 and the oxygen or air gas distribution plate 20 of the next adjacent cell 11. The interface layer or plate 37 may comprise an impervious carbon plate or any other conventional interface as may be desired. In the bi-polar assembly 36, the respective plates 18 and 20, having the interface 37 therebetween, are securely connected together as a unit so as to have good electrical conductivity.

In order to facilitate the gas flow in the gas distribution plates 18 and 20, respective channels or grooves 38 or 39 are employed. The grooves 38 in the hydrogen gas distribution plate 18 are arranged orthogonally or perpendicularly to the grooves 39 in the oxygen or air gas distribution plate 20. This allows the grooves to be easily connected to respective input and output manifolds 12 and 15, for example, on different sides of the cell stack assembly 10. Although grooves within a particular plate, such as plates 18 or 19, are shown as extending in a unidirectional manner in FIG. 2, there can be cross-channels made between these grooves to aid in the distribution of the fluidic reactants. When such cross-channels are utilized, the primary flow of reactants is still in the direction of the grooves 38 and 39 as shown in FIG. 2; that is, in the direction that the reactants flow between the reactant input and collecting manifolds.

The gas distribution plates 18 and 20 supply the respective hydrogen and oxygen or air gases to the surfaces of their respective anode 31 or cathode 35. In order to more evenly distribute the respective gases at the anode 31 or cathode 35 plate surfaces, the gas distribution plates 18 and 20 are preferably formed of a porous carbon material. This allows the respective gases to flow through the pores of the plates 18 and 20 between the respective channels 38 or 39 to provide more uniform gas distribution over the face of the respective anode 31 or cathode 35.

The current collecting plate 28 can be combined in an assembly 40 with a gas distribution plate 18, as shown in FIG. 2. Since the current collecting plate 28 is normally formed of an impervious material, such as aluminum, the purpose of the layer or plate 60 is to prevent corrosion of the plate 28. A cooling plate assembly, shown as 21 in FIG. 1, can be made in a similar manner comprising a gas distribution plate and a cooling plate with an interface layer or plate therebetween.

Figure 3:
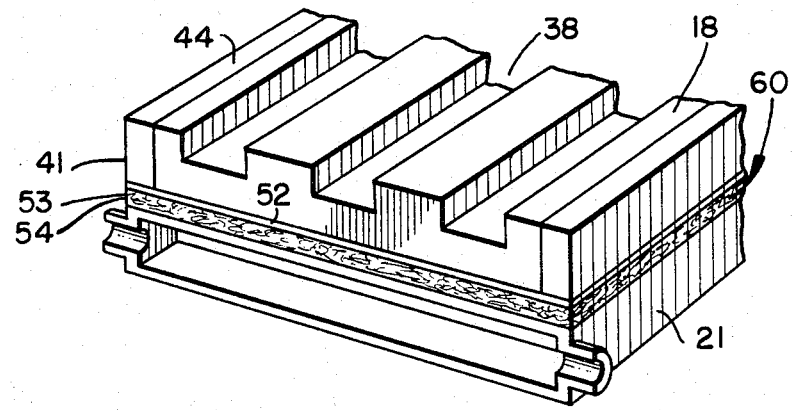
FIG. 3 is a perspective view in partial cross-section showing a corrosion resistant interface arrangement between a gas distribution plate and a cooling plate.
Figure 4:
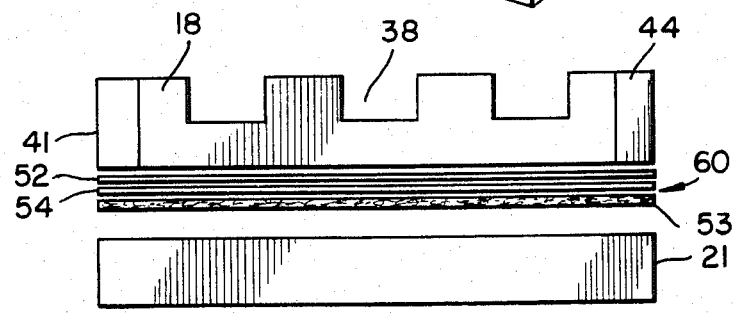
FIG. 4 is a schematic exploded view of the arrangement performing the interface of FIG. 3.

Referring now to FIGS. 3 and 4, an improved interface layer 60 will be described. Interface layers 60 are typically employed between gas distribution plates 18 or 20 and cooling plates 21 or current collecting plates 28. The cooling plates and current collecting plates are generally formed of metal which is subject to corrosion by the acid of the electrolyte 33. In the prior art fuel cell stacks 10, phosphoric acid permeating from a fuel cell 11 through the interface layer 60 into the area of a copper-plated cooling plate 21 would tend to corrode it. Corrosion of the cooling plate 21 tends to increase the resistance of the fuel cell stack 10. In the process, corrosion products also can eventually work back to the catalyst and can poison it. The cooling plates 21 should be conductive and non-corroding, however, this is a difficult combination to achieve. The interface layers of the prior art employed Grafoil which can become penetrated by the electrolyte 33 as the cell ages over the long term. It is also an expensive material and can become more porous over time due to exposure to the electrolyte.

In accordance with one embodiment of the invention, a new interface layer configuration 60 for use intermediate gas distribution plates 18 or 20 and cooling plates 21 or current collecting plate 28 in a fuel cell stack 10 serves to prevent corrosion by the acid of the electrolyte 33. As a result, electrical conduction through the interface 60 is preserved and poisoning of the catalyst layers 32 or 34 by corrosion products is avoided. In manufacturing, the interface layer 60 may comprise a first conductive layer 52 preferably comprising porous carbon fiber paper. A second perforate conductive layer, such as a copper screen 53, is employed. Intermediate the first and second conductive layers 52 and 53 is a layer of resinous material 54. The assembly is then hot pressed onto the cooling plate 21 or the current collecting plate 28 to provide bonding and bridging electrical contact between the carbon paper 52 and the cooling plate 21 or current collecting plate 28. The resin material 54 will have filled substantially any void space between the carbon paper 52 and the copper screen 53. This process prevents access of the electrolyte 33 or of air to the interfacial zone. In this manner, electrical conduction is achieved while corrosion is inhibited or prevented. A preferred resinous material comprises polyethersulfone and the hot pressing is preferably carried out at from about 400 to about 600 psi and from about 600° to about 700° F. The resultant structure is as shown in FIG. 3 wherein the carbon paper is securely bonded and electrically connected to the cooling plate 21 and compressed against the gas distribution plate 18.

A configuration as depicted in FIG. 3, was successfully tested for over 1000 hours at an operating temperature of about 375° F. to 400° F. in a ten cell stack. The stack had six interfaces 60 between respective gas distribution plates and a cooling plates 21 and gas distribution plates and a current collecting plate 28. The measured interface IR losses in this test remained acceptably low and steady throughout the test period. The cells 11 adjacent to cooling plates 21 and current collecting plates 28 performed similarly with other cells 11, thus showing no signs of electrode poisoning or corrosion products. An inspection of the interfaces in the stack 10 showed all to be intact with no sign of corrosion.

In addition to the embodiment of the invention described above, a second embodiment is possible. In the second embodiment, the interface is made in a manner similar to that described above, except that the gas distribution plate 18 is assembled to the interface assembly 60 at the same time or before the cooling plate or current collecting plate and interface are hot pressed thereon. A third embodiment is also possible wherein the first conductive layer 52, such as a porous carbon fiber paper, is eliminated as an element. In the third embodiment, a gas distribution plate, such as plate 18, is placed on the layer of resinous material 54. The resinous material is placed on a second perforate conductive layer, such as a copper screen 53, which, in turn is placed on the cooling plate 21 or the current collecting plate 28. This assembly is then hot pressed together to provide bonding and bridging electrical contact between the gas distribution plate 18 and the cooling plate 21 or the current collecting plate 28.

While carbon paper is a preferred conductive layer material, other materials which could be employed comprise wet proofed carbon paper, vitreous carbon, molded carbon plates, corrosion resistant foil material such as gold. Also, as mentioned above in conjunction with the third embodiment of the invention, the conductive layer 52 can also be any suitable gas distribution plate. While a copper screen is a preferred perforate conductive layer, other perforate material which could be employed comprise perforated, expanded metals, non-woven metals and foamed metals. Suitable materials for use of a perforate conducting layer also include nickel, gold, other corrosion resistant metals or metal alloys and very conductive plastics. While polyethersulfone is a preferred resinous layer material, other resinous materials which could be employed comprise polyphenylsulfone, fluorinated polymers such as PTFE, fluorinated ethylene propylene, and perfluoralkoxy polymers and other corrosion resistant thermoplastic materials.

The patents and publications described herein above are intended to be incorporated by reference herein. This invention may be embodied in other forms or carried out in other ways without departing from the spirit or essential characteristics thereof. The present embodiments are therefore to be considered as in all respects illustrative and not restrictive. The scope of the invention being indicated by the appended claims, and all changes which come within the meaning and range of equivalency are intended to be embraced therein.

What is claimed is:

1. A fuel cell stack comprising a plurality of stacked elements; at least one corrosion resistant, electrically conductive, fluid impervious interface arranged between two of said elements which are adjacent to one another, said interface comprising a first conductive layer and a second perforate conductive layer being bonded to each other and to the surface of at least one of said two elements by a hot-pressed resin, said first and second conductive layers providing bridging electrical contact between said two elements, said resin filling substantially any remaining void space between said two elements.

2. A fuel cell stack as in claim 1 wherein one of said two elements comprise a gas distribution plate and another of said two elements comprises a cooling plate.

3. A fuel cell stack as in claim 1 wherein one of said two elements comprises a gas distribution plate and wherein the other of said two elements comprises a current collecting plate.

4. A fuel cell stack as in claim 1 wherein said first conductive layer comprises carbon paper, said second perforate conductive layer comprises a copper screen, and said resin comprises polyethersulfone.

5. A fuel cell stack as in claim 1 wherein said two elements are both bonded to the interface.

6. A fuel cell stack as in claim 1 wherein the first conductive layer is a gas distribution plate.

7. A fuel cell stack comprising a plurality of stacked elements at least one of which is adapted to contain electrolyte, at least one corrosion resistant, electrically conductive, fluid impervious interface arranged between two of said elements which are adjacent to one another, said interface comprising a first conductive layer and a second perforate conductive layer being bonded to each other and to the surface of at least one of said two elements by a hot-pressed resin, said first and second conductive layers providing bridging electrical contact between said two elements, said resin filling substantially any remaining void space between said two elements, said interface extending fully between the two elements to prevent access of electrolyte to the interface.

8. A fuel cell stack as in claim 7 wherein one of said two elements comprises a gas distribution plate and another of said two elements comprises a cooling plate.

9. A fuel cell stack as in claim 7 wherein one of said two elements comprises a gas distribution plate and wherein the other of said two elements comprises a current collecting plate.

10. A fuel cell stack as in claim 7 wherein said first conductive layer comprises carbon paper, said second perforate conductive layer comprises a copper screen, and said resin comprises polyethersulfone.

11. A fuel cell stack as in claim 7 wherein said two elements are both bonded to the interface.

* * * * *